United States Patent [19]
de Guillenschmidt et al.

[11] Patent Number: 4,577,962
[45] Date of Patent: Mar. 25, 1986

[54] METHOD AND EQUIPMENT FOR THE CONTROL OF AIMING AND FIRING AT A REAL TARGET

[75] Inventors: Pièrre de Guillenschmidt, Neuilly S/Seine; Jacques Hubert, Asnieres; Michel Goujon, Chauteloup les V.; Christian Saunier, Ermont, all of France

[73] Assignee: Giravions Dorand, Suresnes, France

[21] Appl. No.: 539,694

[22] Filed: Oct. 6, 1983

Related U.S. Application Data

[63] Continuation of Ser. No. 235,616, Feb. 19, 1981, abandoned.

[30] Foreign Application Priority Data

Mar. 7, 1980 [FR] France ................ 80 05126

[51] Int. Cl.$^4$ .................. G01C 3/08; G01B 11/26; F41G 3/26
[52] U.S. Cl. ..................... 356/5; 89/41.06; 235/412; 356/152; 434/22
[58] Field of Search ............ 89/41 L; 235/411, 412, 235/413, 414, 415, 416; 273/310, 311, 312, 359, 360, 371; 343/7 G, 12 MD; 356/5, 152; 434/19, 21, 22

[56] References Cited

U.S. PATENT DOCUMENTS

| | | | |
|---|---|---|---|
| 2,016,096 | 10/1935 | Martin | 219/39 |
| 3,845,276 | 10/1974 | Kendy et al. | 89/41 L |
| 3,882,496 | 5/1975 | Lewis et al. | 434/21 |
| 3,927,480 | 12/1975 | Robertsson | 35/25 |
| 3,954,335 | 5/1976 | Bodlaj | 356/5 |
| 3,954,340 | 5/1976 | Blomquist et al. | 89/41 L |
| 4,028,991 | 6/1977 | Kuby | 89/41.03 |
| 4,218,138 | 8/1980 | Robertsson | 89/41 L |
| 4,218,834 | 8/1980 | Robertsson | 89/41 L |

FOREIGN PATENT DOCUMENTS

| | | |
|---|---|---|
| 15484893 | 10/1970 | Fed. Rep. of Germany . |
| 1580909 | 9/1969 | France . |
| 2016096 | 4/1970 | France . |
| 2086182 | 12/1971 | France . |
| 2197458 | 3/1974 | France . |
| 2221705 | 10/1974 | France . |
| 2415791 | 8/1979 | France . |
| 2436357 | 4/1980 | France . |
| 1403779 | 8/1975 | United Kingdom . |
| 1408230 | 10/1975 | United Kingdom . |
| 2012925 | 8/1979 | United Kingdom . |
| 2018407 | 10/1979 | United Kingdom . |
| 2033619 | 5/1980 | United Kingdom . |
| 1568915 | 6/1980 | United Kingdom . |
| 2041177 | 9/1980 | United Kingdom . |

OTHER PUBLICATIONS

Merrill I. Skolnik, Radar Handbook, 1970, pp. 37-48 to 37-51 and 37-60 to 37-67.

*Primary Examiner*—Stephen C. Bentley
*Attorney, Agent, or Firm*—McDougall, Hersh & Scott

[57] ABSTRACT

A firing weapon is associated with a laser radiation source mounted in proximity to the weapon and also with a detector which is sensitive to the laser radiation. The orientation of the radiation is adjusted independently of the aiming of the weapon in order to carry out continuous detection of the target as a result of detection of radiation by the detector after reflection from the target. The orientation and the time of transit of radiation between source and target are utilized in order to obtain target data relating to position in elevation and in azimuth as well as distance of the target. The data are processed in order to orient a real shot or in order to compare the data quantitatively with the position of a simulated projectile which follows a fictitious trajectory.

8 Claims, 4 Drawing Figures

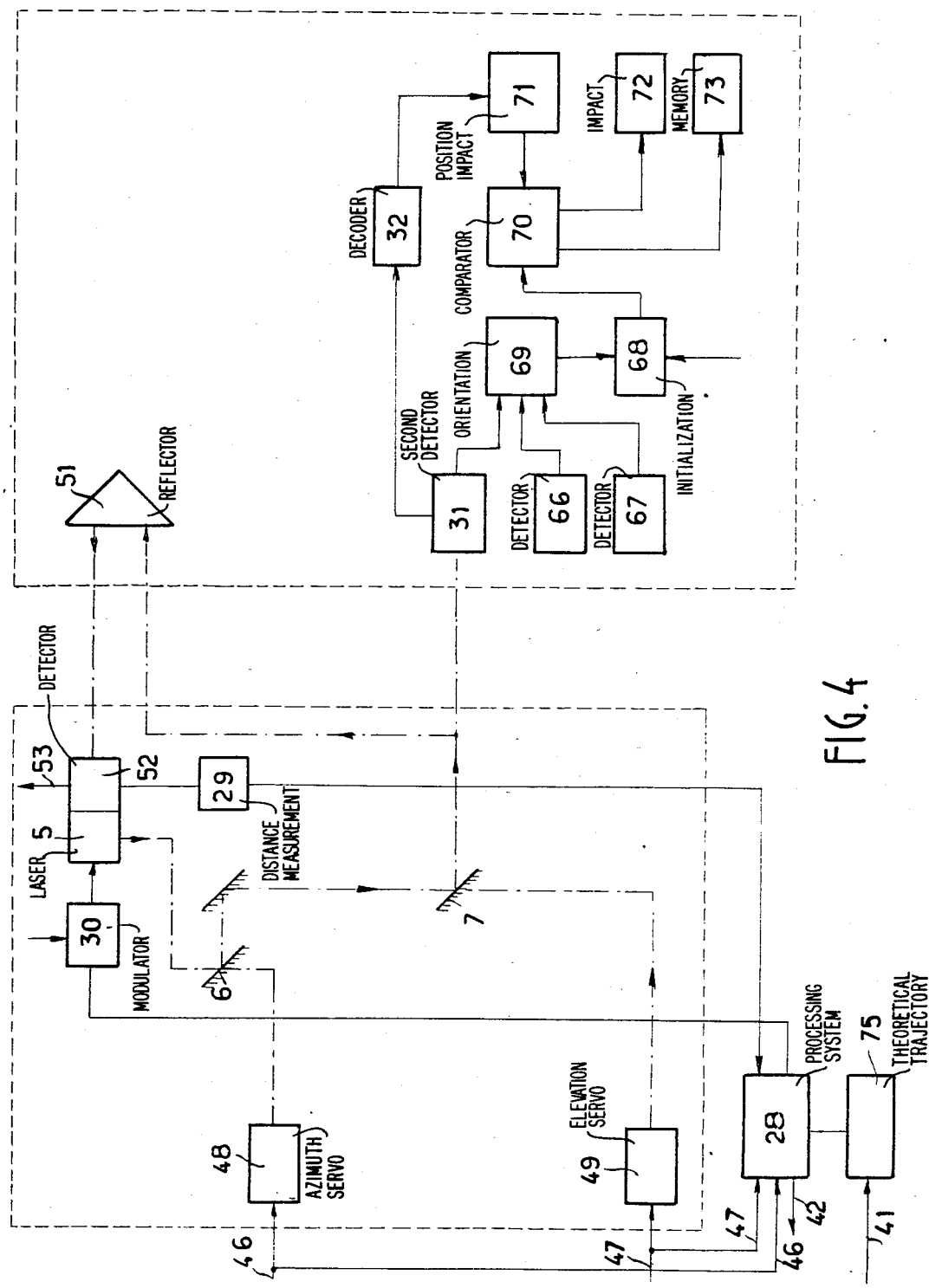

METHOD AND EQUIPMENT FOR THE CONTROL OF AIMING AND FIRING AT A REAL TARGET

This is a continuation of application Ser. No. 235,616, filed Feb. 19, 1981, now abandoned.

This invention relates to fire-control techniques and applies to real or simulated firing of projectiles upon real targets. The invention is essentially intended to facilitate computation of target displacements in order to determine the characteristics of real shots or to evaluate fictitious shots. To this end, the invention has recourse to target tracking by a beam of electromagnetic radiation emitted from the firing weapon.

Laser beams are in fact already employed in equipment designed for the training of personnel in aiming and firing. Equipment of this type consists of firing simulators in which the laser beam simulates a fictitious shot and provides "shot-on-target" information in the event of a direct hit, the target being accordingly equipped with a number of detectors or reflectors for this purpose. However, systems of this type are capable of providing information only on the "all-or-none" principle. In other words, they do in fact indicate a direct hit if one of the detectors with which the target is equipped has been sensitized by the laser beam but, if the shot has missed the target and no detector has been sensitized, such systems provide no information on the value of the off-target distance of the projectile or even on the direction of the projectile with respect to the target direction (high, low, left or right). In conjunction with firing simulator systems, devices have also been employed for measuring the distance between the weapon and the target according to the round-trip time of the laser pulse. In this case, however, telemetry is carried out prior to the instant of firing of the weapon and independently of the actual firing operation. The result of a simulated shot therefore cannot take into account the target movements along the firing axis after the shot has been delivered.

The invention makes it possible to overcome these drawbacks, essentially insofar as it entails the use of laser radiation, not for the actual simulation of a fictitious shot, but for providing target data at each instant including within the real or simulated firing time interval considered from the instant of weapon discharge to final impact. The target data are intended to represent not only the position of the target both in elevation and in azimuth (angular deviation measurement) but also the distance from weapon to target (telemetry). The invention is applicable in a particularly advantageous manner to firing simulators but also applies to real firing, in which case the invention permits true automatic fire control based on angular deviation measurements and telemetry which are performed continuously by means of the laser beam.

A method in accordance with the invention essentially consists in associating a firing weapon with a laser radiation source mounted in proximity to said weapon and also with a detector which is sensitive to said radiation. The orientation of the radiation is adjusted independently of the aiming of the weapon in order to carry out continuous detection of the target as a result of detection of radiation by said detector after reflection from the target. After adjustment, the orientation and the time of transit of radiation between source and target are used to obtain target data relating to the position of the target in elevation and in azimuth and to the distance of the target and therefore to the target velocity if necessary. The target data are then processed in order to orient a real shot or in order to compare said data quantitatively with the position of a simulated projectile which follows a fictitious trajectory.

In order to facilitate automatic adjustment of orientation of the laser radiation, it is an advantage to carry out a first field scan by the laser radiation until detection of the target by reflection of the radiation from this latter and then to tract the target by maintaining the orientation of the radiation centered on the target during all displacements of the target.

This procedure has the further advantage of making the best possible use of the characteristic properties of laser beams, especially their very narrow beam angle, their considerable range and the accuracy of data supplied. The first beam scan serves to locate the target within the field at the high speed required in firing exercises on real targets. Subsequent automatic tracking of the target can produce target data both in direction and in distance at any instant of tracking of said target.

The target data may be employed for defining the velocity of the target during its displacements in real time. Thus, if the data are processed in order to adjust the direction of aim of the weapon automatically, the result thereby achieved is automatic fire-control which takes into account the so-called future point and guards against any erroneous estimation of target velocity by the "gunner" or firer. This applies in particular to the firing of real ballistic projectiles.

However, the target data obtained in accordance with the invention are also very useful in the case of fictitious shots. Insuch a case, the data can be processed continuously during all displacements of the target after it has been located in order to compare them with the position both in direction and in distance of a fictitious projectile along a simulated theoretical trajectory and in order to determine from said data whether said trajectory terminates at an impact on the target (direct hit). Thus the invention permits accurate determination in real time of the direction, distance and velocity of a target sighted by a gunner or weapon firer. The position of the target can then be compared with respect to the position of a fictitious projectile which has been fired against the target and has followed a theoretical trajectory when the time elapsed from the instant of discharge of the fictitious projectile corresponds to the time which would have been required for a real projectile to reach the target. The result can then be transmitted to the firer and if necessary to the target and/or to a monitoring station. It is possible to determine at each instant and up to the point of impact both the direction of the target and the distance from this latter to the weapon in this direction since the telemetering operation itself can be performed in a practically continuous manner by means of laser pulse trains which follow each other at high frequency.

The invention also relates to a fire-control system for firing at a real target and comprising means suited to the practical application of the method outlined in the foregoing.

The fire-control system under consideration is advantageously provided, in the immediate proximity of a weapon associated with a sighting equipment unit for pointing said weapon. The system includes a source which serves to produce a beam of electromagnetic radiation (laser), the orientation of which can be adjusted independently of the weapon-pointing operation, a detector sensitive to said radiation and means for automatically adjusting the orientation of the laser beam on the target at the moment of firing in order to ensure that said beam is received by said detector after reflection from the target. Means are provided for maintaining the beam automatically oriented on the target in spite of the displacements of this latter. The beam which is thus oriented permits accurate determination at least at two different instants of the position along the three axes (elevation, azimuth, distance) of a target which is either stationary or moving with respect to the firer. As a general rule, means are provided for continuously and automatically delivering data which define the orientation of the beam with respect to a reference direction. In addition, provision is usually made for time-measurement means adapted to receive two signals obtained respectively from the source and from its associated detector and to deliver elapsed time-interval measurements of round-trip traversals carried out between the sighting equipment and the target by successive electromagnetic radiations emitted by the source. This makes it possible at each instant to provide information defining the distance of said target with respect to the sighting equipment. The direction of said equipment can in turn be defined with respect to the reference direction or constitute said reference direction.

Particularly within the sphere of application of a firing simulator, a fire control equipment unit in accordance with the invention an comprise a computer or like data-processing system. By means of this system, the theoretical trajectory of a projectile can be determined in real time from the pointing elements used for aiming the weapon which is intended to fire the projectile using the projectile ballistics and aerological conditions in the case of a ballistic projectile or using projectileguiding and transfer-function orders in the case of a guided missile. The position of a projectile of this type can then be compared at each instant with respect to the location of a predetermined point of the target expressed by the target data determined from the orientation of the laser beam and from the distance measured along said beam. Thus, it is possible to determine the result of the shot which has been fired.

In order to permit adjustment of orientation of the laser beam, it is preferred to use means for varying the direction of the beam without any movement of the source itself. This is to be achieved in one form by the use of one or two small mirrors actuated by the beam-scanning control meachanism and placed in front of the emitting source. An advantage of this arrangement lies in the fact that it permits the achievement of very high standards of accuracy while having relatively low driving power requirements.

When the fire-control system in accordance with the invention is employed as an aid to adjustment of real firing of a ballistic projectile, the source of electromagnetic radiations can have sufficient power to ensure that the target itself reflects the beam emitted by the firer in the same direction as that of the outward trip and illuminates the detector which is associated with the emitting source. The system then delivers data relating to direction and distance of the target to computer or like data-processing system. From these data, the computer determines the target velocity and provides the weapon pointing elements (elevation and azimuth), taking into account the ballistics of the projectile employed and the aerological conditions which may previously have been stored in the computer memory. These pointing elements can be transmitted to the firer if the weapon system is provided with manually operated aiming-control mechanisms or directly to said mechanisms if these latter are automated.

In order to check his aim, the firer may first proceed to fire a fictitious shot. The computer then determines the theoretical position of the simulated projectile when this latter is sensed as having reached the target and then compares this theoretical position with the target position. The firer then fires a real shot with new target-position data which he will correct if necessary as a function of the result of his simulated shot.

By making use of simulated shots either as a training means or for the purpose of umpiring combat exercises, it is no longer possible as a rule and for safety reasons to employ a laser of the type considered earlier. In such circumstances use may be made of a verylow-power system such as a gallium arsenide laser diode. In such cases the target should be equipped with one or a number of reflectors capable of reflecting the beam back in the same direction as that of the incident beam.

In order to permit utilization of the results of the comparison between a fictitious shot and the target position, the target can advantageously be equipped with one or a number of detectors adapted to receive the laser beam and provided with a decoding system.

The system of reflectors with which the target is equipped should advantageously be capable of covering a broad solid angle, with the result that an appreciable number of reflectors and detectors may prove necessary for this purpose.

The detector associated with the emitting source and the detectors on the target can be of the same type and can consist either of photomultipliers or of semiconductor detectors or of detectors of any other type which is sensitive to the radiations employed. The data to be transmitted between the firer and the target are preferably transmitted by modulation of the beam of electromagnetic radiations delivered by the source which is pointed at the target and equipped with its detecting system. A signal-decoding system can be provided for constituting the data which have thus been transmitted. Data relating, for example, to the identity of the firer, information required for determining the result of a shot, data relating to the time of an event and other informaton which may be considered useful can be transmitted in this manner. This has the advantage both of ensuring freedom of combat vehicle radio receivers from interference and of ensuring enhanced reliability of transmissions. Should it be desired to remove any potential danger of faulty measurement, the detector associated with a source for emitting electromagnetic radiations can e adapted to take into account only return radiations having a code corresponding to the code of the source with which the detector is associated. Thus, when carrying out any measurement on a pulse train, beams emanating from other sources and impinging on the detector at the same time are prevented from disturbing this measurement.

Irrespective of the type of application considered and whether real or fictitious firing is contemplated, the fire-control system preferably comprises a two-stage scanning system for automatic adjustment of orientation of the laser beam. During a first stage or so-called acquisition stage, when the sighting system is pointed in the presumed direction of the target, a signal which can be related to firing or to any other event may initiate a first scan which covers an entire field of observation of the sighting system by displacing the beam from the top left-hand limit of observation, then successively from left to right, then from right to left, and moving down each time by a value such that the laser beam overlaps the band which was previously scanned.

When the detector associated with the emitting source is sensitized by a return beam reflected from the target (thus indicating that the target has been struck by the incident beam), this initial scan stops and is replaced by a second scan or so-called tracking scan which takes place within a narrow observation zone containing the target. In the second scan the direction of displacement of the beam is reversed as soon as it is no longer reflected from the target in order to ensure that the beam is continuously centered on this latter. The result is exactly the same as if the beam had located the target and then locked on the target. The transition from the first scan to the second scan is automatic and the same applies to the scanning operations themselves.

In the case of the first scan, the field can be defined so as to cover only part of the field of fire. More specifically, the scanning field can be limited to the immediate vicinity of a simulated projectile at all points of its trajectory. This even makes it possible to observe the results of firing at a number of targets only by making a comparison between the position and distance of the target and those of the projectile in respect of only one target detected in this field.

One particular embodiment of the invention relating to a firing simulator will now be described in greater detail but not in any limiting sense, reference being made to the accompanying drawings, wherein:

FIGS. 3 and 4 are both schematic diagrams of the electronic circuits.

Figure 1:
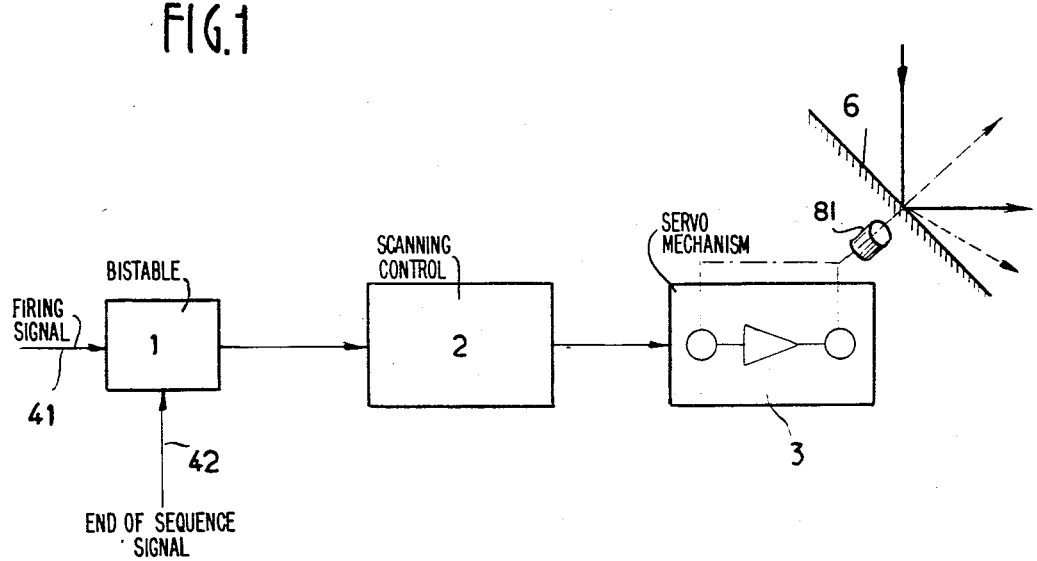
FIGS. 1 and 2 are schematic illustratons of the essential constructional design of the equipment employed.

The system shown in FIG. 1 essentially comprises an orientable sighting equipment unit for aiming and firing at a moving target. Associated with this equipment unit is a laser radiation source and a detector which is sensitive to said laser radiation and detects the beam emitted by the source when this latter returns after a round trip between source and target. The target is provided with a reflector for the laser beam. In addition, the target is adapted to carry detectors which are also sensitive to the radiation from the emitting source.

The sighting equipment unit, the source and its associated detector are mounted on a moving mechanical assembly which can be oriented by the firer. In addition, however, orientation of the beam itself can be varied in all directions so as to scan the entire field in which the target may be located. In a preferred embodiment this is achieved by means of two orientable mirrors interposed on the path of the beam in front of the source. The motors driving the mirrors in rotation are controlled by a scanning-control device to determine the orientation of the beam with respect to a reference direction constituted by the orientation of the sighting unit. Data for this purpose are delivered in the form of two angular indications, namely elevation and azimuth.

Figure 2:
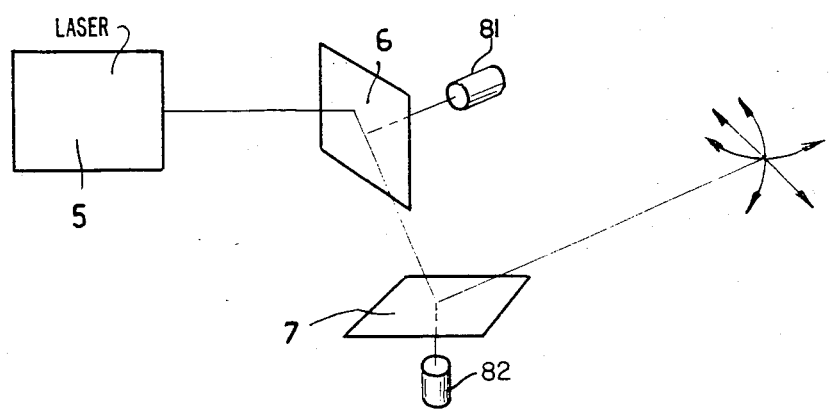

FIG. 1 shows diagramatically the devices for effecting scanning movement of the laser beam with respect to a reference direction fixed at the moment of firing. These devices comprise a bistable circuit 1 triggered by a firing signal 41. When the weapon is in the firing position and loaded with a ballistic projectile (as in the case of a shell) or guided along a line-of-sight (as in the case of a missile), scanning servomechanism 3 under the control of electronic circuits 2 defining the type of scan is accordingly started-up by means of the triggered bistable device 1. When an end-of-sequence signal 42 is applied to said bistable device 1, the operation is stopped. The scanning operation performed by means of the servomechanism 3 consists in reflecting the laser beam a predetermined pattern by means of mirrors such as the mirror 6. As shown in FIG. 2, the laser beam is emitted by the source 5 which is stationarily fixed on the sighting unit and is of the gallium-arsenide diode type. The laser beam which is pulsed at the frequency F is of elliptical shape and is reflected successively from a first mirror 6 and from a second mirror 7. These mirrors are shown with their associated motors 81, 82 for subjecting the beam which has thus been reflected to displacement in two perpendicular directions. The position of the mirrors provides the angular values of elevation and azimuth. A first scan or so-called acquisition scan is carried out over a relatively wide range in both directions in order to locate the target. When the laser beam is in the direction of the reflector which is mounted on the target, said beam is reflected in the direction of a detector associated with the source and mounted on the sighting unit. The detector will deliver a signal indicating the presence of the beam and indicating that the beam is oriented in the direction of the target. The scanning control mechanism is then operated in response to the detection of the beam in a tracking mode in order to follow the displacements of the target with respect to the reference direction.

Figure 3:
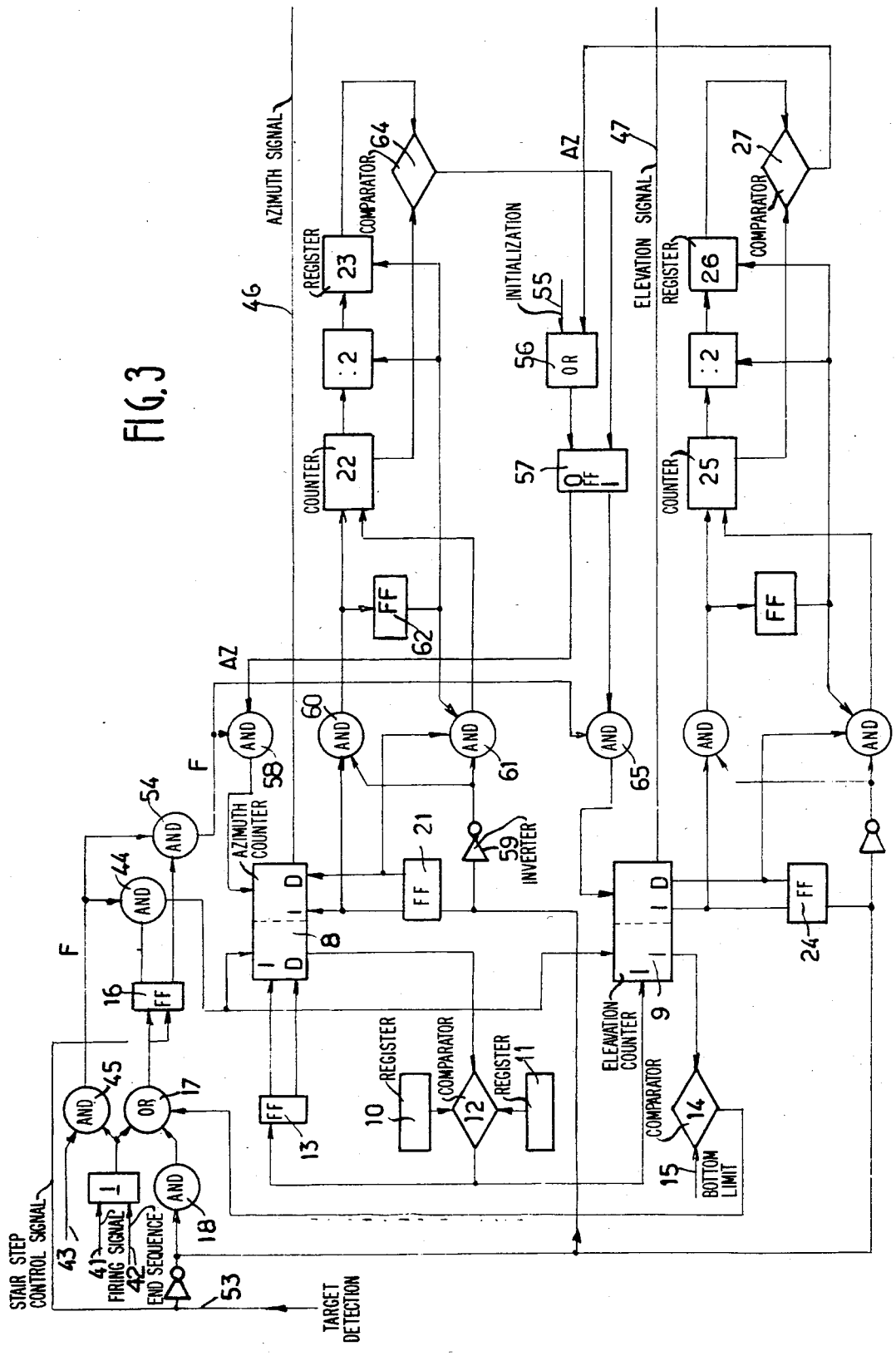

The control means described in the foregoing are shown in detail in the schematic diagram of FIG. 3. This FIGURE shows the bistable device 1 to which are applied the firing signal 41 and the end-of-sequence signal 42. At the outset, the scan is initialized from a point of origin corresponding for example to the top left-hand limit of the field of observation and two counters 8 and 9 set to read zero. These counters are either incremented or decremented by a stair-step control signal 43 applied thereto via an AND-gate 45 enabled by the output signal of the bistable device 1. The counter 8 is dedicated to the value of angular orientation of the beam in azimuth whilst the counter 9 is dedicated to its value in elevation. Each counter 8 and 9 has two segments one for counting on a large scale and one for counting on a smaller scale.

At the time of initialization, a bistable device 16 is brought to a position such that a control signal is transmitted via an AND-gate 44 to the azimuth counter 8 in which the signal increments the large scale portion a frequency f which is lower than that of the laser pulsations. When the value of the counter within a comparator 12 has attained the value of a register 10 corresponding to the right-hand limit of the observation zone the comparator 12 then causes the large scale portion of the elevation counter 9 to increment by one count and causes the bistable device 13 to change state. This device then enables the azimuth counter 8 to decrement in response to the signal 43 which continues to be transmitted by the gate 44. When the value of the counter 8 becomes equal to that which corresponds to the left-hand limit of the observation zone defined by the contents of a register 11, the comparator 12 produces an output incrementing the high weights of the elevation counter 9 by one step and also initiates return of the bistable device 13 to the incrementation position of the azimuth counter 8. The value of the elevation counter 9 is continuously compared by a comparator 14 with the value of a register 15 which corresponds to the bottom limit of the observation zone. When equality is established without detection of any target, the comparator 14 produces a further initialization by means of an OR-gate 17 and the acquisition scan is resumed. The values of the registers 10, 11 and 15 may be modified in the meantime, for example when they are controlled so as to define a limited field which undergoes a displacement in order to follow the theoretical trajectory of the projectile.

At the output of the counters 8 and 9 respectively, the signals 46 and 47 are transmitted to a pair of servomechanisms 48 and 49 which includes the motors 81 and 82 shown in FIG. 4 and cause the laser beam emitted by the source 5 to scan by movement of the mirrors 6 and 7. The rate of displacement is chosen in accordance with the frequency of the signal 43 so as to permit at least one measurement of the transit time of the beam when this latter is returned by a reflector 51 on the target and received by the detector 52 which is associated with the source on the sighting unit. This measurement is carried out at 29 and represents the distance at which the target is located with respect to the sighting unit in the direction of the beam.

When the target mounted reflector 51 is located in the direction of the laser beam, the detector 52 receiving the beam on the return path emits a target detection signal 53. As shown in FIG. 3, this signal triggers the bistable device 16 which replaces the acquisition scan by the tracking scan, whereupon the control signal 43 is coupled through the AND-gate 54.

The tracking scan is carried out in the immediate vicinity of the reflector 51 located on the target. The direction of scanning is reversed as soon as the detector 52 is no longer sensitized by the return pulse, with the result that the axis of the beam is continuously centered on the reflector. An initialization signal 55 passed through an OR-gate 56 ensures, by means of the flip-flop circuit 57 to which it is then applied, that the tracking scan begins with a variation of azimuth. The control signal is then transmitted via the AND-gate 58 to the azimuth counter 8 in which said signal decrements and then increments the small scale portion according to the state of a flip-flop circuit 21 controlled by the reversed detection signal 53. During the same period, the signal which is again reversed at 59 and applied to the AND gates 60 and 61 first increments a counter 22 by means of output pulses of the counter 8 and then the decrementation of said counter 22 by means of the same decrementation pulses when, after incrementation, a flip-flop circuit 62 has opened the gate 61. The same flip-flop circuit 62 initiates storage in a register 23 of the value divided by 2 of the counter 22 which is reached at the end of the incrementation when disappearance of the detection signal initiates changeover to decrementation. The value of the counter 22 at each instant is compared with the value of the register 23. When equality is achieved and the beam is accordingly centered at the mid-point of the reflector in azimuth, the comparator 64 initiates changeover of the flip-flop circuit 57, whereupon the control-signal pulses are transmitted via the AND-gate 65 to the small scale portion of the elevation counter 9.

The elevation-tracking circuit is similar to the circuit described in the foregoing in the case of the azimuth. The counter 9 is either incremented or decremented according to the state of a flip-flop circuit 24 which is controlled by the presence or absence of the detection signal. When the signal disappears, a register 26 contains the maximum value divided by 2 of a counter 25 whose output is divided by 2 and compared with the contents of register 26 and this counter is decremented. When that value equals that of the register 26, a comparator 27 through the OR-gate 56 causes the flip-flop circuit 57 to revert to the initial state in order to resume the process of tracking in azimuth.

The counters 8 and 9 are therefore incremented or decremented according to the displacement of the target with respect to the line-of-sight; the information relating to angular deviation in azimuth and in elevation is continuously delivered to a processing system 28 during tracking of the target. AT the same time, since the beam is locked on the reflector, the time-measuring system 29 delivers the distance information to the processing system which determines the metric angular deviation of the target with respect to the axis of reference. The processing system compares these values with reference values corresponding to the coordinates of a ballistic or guided missile along a theoretical trajectory determined at the moment of firing at 75. As a function of this comparison, the processing system 28 controls a modulator 30 which modulates the laser emission from 5 in accordance with a code of conventional type. On the target itself, a second detector 31 located in proximity to the reflector 51 receives the pulses emitted by the laser source and electronic circuits process the data delivered and shaped by a decoder 32.

The electronic circuits essentially comprise a comparator 70 for parameters which are characteristic of the target. In the particular case of FIG. 4, the target is equipped with a plurality of detectors comprising (in addition to the detector 31 already mentioned) detectors 66, 67 and so on. Depending on the detector which is sensitized, the orientation of the target with respect to the firing axis is determined at 69. Furthermore, the nature of the target which is displayed at the time of initialization of the system makes it possible to define at 68 the area of vulnerability of said target and the types of armament and ammunition to which the target is sensitive. The data decoded by the decoder 32 are utilized in conjunction with the specific target data in order to determine as a function of the position of impact 71 whether a direct hit has been achieved or not and to control a circuit 72 in consequence. All these date can be stored in memory at 73 for subsequent delayed utilization.

In this example, the acquisition scan is limited to the presence of a single target. In the case of a plurality of targets which are present within the field of observation, other forms may be adopted and other means may be employed. In particular, the acquisition scan can be carried out over a larger field. Accordingly, a value group will be associated with each target and one value will establish the tracking-scan selection criterion.

What is claimed is:

1. A method of fire control for firing at a real target comprising the steps of: associating a firing weapon with a laser radiation source and a detector sensitive to said radiation mounted in proximity to said weapon, automatically adjusting the orientation of the radiation from said source independently of the aiming of the weapon for continuous detection of the target as a result of detection of radiation by said detector after reflection from the target, determining said orientation and the time of transit of radiation between source and target, obtaining from said orientation and time of transit target data relating to the target position in elevation and azimuth, and to the target distance, and evaluating the result of a simulated shot by comparing said data quantitatively with the position of a simulated projectile along an expected trajectory, wherein said adjusting step comprises carrying out a first field scan by the radiation until detection of said radiation after reflection from the target, then tracking the target by a second field scan wherein the orientation of the radiation is maintained centered on the target during all target displacements.

2. A method according to claim 1, wherein said target data including the data relating to the target position in elevation and in azimuth and the data relating to the target distance, are determined at least at two different instants.

3. A fire control system for firing at a real target, comprising a source of laser radiation and a detector sensitive to said radiation, both mounted in proximity to a firing weapon, means for automatically adjusting the orientation of the radiation independently of aiming of the weapon for continuous detection of said radiation by said detector after reflection from the target, means whereby target data relating to the position in elevation and in azimuth and to the distance of the target, are determined from said orientation of the radiation and from the time of travel of the radiation between the source and the target, means for determining at at least two different times a theoretical simulated-shot trajectory, means for comparing said target data at said times with the position and distance of a simulated projectile on said trajectory and evaluating therefrom the result of said simulated shot, including means for automatically carrying out a first field scan by the laser radiation until detection of said radiation after reflection from the target and for subsequently tracking the target in a second field scan by maintaining the orientation of the radiation centered on the target in all target displacements, and means for continuously defining said orientation with respect to a reference direction in addition to the distance of the targets in aid orientation.

4. A fire-control system according to claim 3, wherein said system is provided on the target with at least one detector which is sensitive to said radiation and with means for utilizing data transmitted in coded form by said beam.

5. A fire-control system according to claim 3, wherein said system comprises at least one reflector which is sensitive to said radiation on the target.

6. A fire-control system according to claim 3, wherein the scanning means comprise mirrors interposed on the path of the laser radiation emitted by a stationary source on the sighting unit, said mirrors being movable in order to modify the orientation of the beam transmitted in the direction of the target.

7. A system according to claim 3 wherein said target data further comprises information with respect to the velocity of the target.

8. A method of fire control for firing at a real target comprising the steps of: associating a firing weapon with a laser radiation source and a detector sensitive to said radiation mounted in proximity to said weapon, automatically adjusting the orientation of the radiation from said source independently of the aiming of the weapon for continuous detection of the target as a result of detection of radiation by said detector after reflection from the target, determining said orientation and the time of transit of radiation between the source and the target, obtaining from said orientation and time of transit target data relating to the target position in elevation and azimuth and to the target distance, and evaluating the result of a simulated shot by comparing said data quantitatively with the position of a simulated projectile along an expected trajectory wherein said adjusting step comprises carrying out a first field scan by the radiation until detection of said radiation after reflection from the target, then tracking the target by a second field scan wherein the orientation of the radiation is maintained on the target during all target displacements, and wherein said first field scan is defined as a field in the vicinity of the position of a simulated projectile at each point in its expected trajectory and wherein tracking of a target detected in the field is abandoned when the target passes out of the field or when the projectile passes beyond the target without a direct hit.

* * * * *